(12) United States Patent
Balasubramanian et al.

(10) Patent No.: US 11,332,248 B2
(45) Date of Patent: May 17, 2022

(54) WIRELESS PORTABLE AIRCRAFT CARGO CONTROL PANEL WITH PHYSICAL CONTROLS

(71) Applicant: Goodrich Corporation, Charlotte, NC (US)

(72) Inventors: Rameshkumar Balasubramanian, Karnataka (IN); Venkatesan Muthulingam, Karnataka (IN); Steve McQueen, Jamestown, ND (US); Sudhendra Nayak, Bangalore (IN); Naveen Kumar Mallipattana Hiriyannaiah, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 778 days.

(21) Appl. No.: 16/199,351

(22) Filed: Nov. 26, 2018

(65) Prior Publication Data

US 2020/0102076 A1  Apr. 2, 2020

(30) Foreign Application Priority Data

Sep. 28, 2018 (IN) .............................. 201811036797

(51) Int. Cl.
| | |
|---|---|
| *B64D 9/00* | (2006.01) |
| *G06F 3/0488* | (2022.01) |
| *G06F 1/16* | (2006.01) |
| *G06Q 10/08* | (2012.01) |
| *G06K 7/10* | (2006.01) |
| *G08C 17/02* | (2006.01) |

(52) U.S. Cl.
CPC ............. *B64D 9/00* (2013.01); *G06F 1/1626* (2013.01); *G06F 1/1632* (2013.01); *G06F 1/1643* (2013.01); *G06F 3/0488* (2013.01); *G06K 7/10366* (2013.01); *G06Q 10/0833* (2013.01); *G08C 17/02* (2013.01); *B64D 2009/006* (2013.01); *G09G 2354/00* (2013.01); *G09G 2380/10* (2013.01); *G09G 2380/12* (2013.01)

(58) Field of Classification Search
CPC ..... G06F 3/0488; G06F 1/1643; G06F 1/1632
See application file for complete search history.

(56) References Cited

U.S. PATENT DOCUMENTS

| | | | | |
|---|---|---|---|---|
| 10,525,360 | B1* | 1/2020 | Corigliano | ............. A63F 13/92 |
| 2009/0157235 | A1* | 6/2009 | Stebbins | .................. B64C 1/22 |
| | | | | 701/3 |
| 2010/0100225 | A1* | 4/2010 | Reed | ....................... B64D 9/00 |
| | | | | 700/213 |

(Continued)

*Primary Examiner* — David E Choi
(74) *Attorney, Agent, or Firm* — Cantor Colburn LLP

(57) ABSTRACT

Provided are embodiments that include techniques for a wireless portable cargo control panel with physical controls. The techniques include a portable electronic device (PED) including a display, the PED configured to communicate with a master control panel (MCP) that controls a cargo handling system and a portable control panel (PCP). The PCP includes an interface configured to couple the PED, one or more dedicated physical input selection devices, a directional controller, and one or more orientation indicator displays, wherein each of the one or more orientation indicator displays are configured to be updated based at least in part on orientation information associated with the cargo handling system, PCP, and PED.

17 Claims, 15 Drawing Sheets

(56) References Cited

U.S. PATENT DOCUMENTS

| | | | |
|---|---|---|---|
| 2010/0213313 A1* | 8/2010 | Reed | B64D 9/00 244/118.1 |
| 2010/0238010 A1* | 9/2010 | Ishikawa | B66F 17/003 340/441 |
| 2013/0297065 A1* | 11/2013 | Huber | B64D 9/00 700/230 |
| 2015/0241961 A1 | 8/2015 | Morris et al. | |
| 2015/0277492 A1 | 10/2015 | Chau et al. | |
| 2016/0117536 A1 | 4/2016 | Johnsen | |
| 2017/0372484 A1* | 12/2017 | Carlson | G06T 7/254 |
| 2019/0384356 A1* | 12/2019 | Balasubramanian | G06F 3/0346 |
| 2020/0057539 A1* | 2/2020 | Balasubramanian | G06F 3/04886 |
| 2020/0058170 A1* | 2/2020 | Balasubramanian | G06T 7/20 |
| 2020/0102076 A1* | 4/2020 | Balasubramanian | G08C 17/02 |

* cited by examiner

WIRELESS PORTABLE AIRCRAFT CARGO CONTROL PANEL WITH PHYSICAL CONTROLS

CROSS-REFERENCE TO RELATED APPLICATIONS

This application claims the benefit of Indian Application No. 201811036797 filed Sep. 28, 2018, which is incorporated herein by reference in its entirety

BACKGROUND

Exemplary embodiments pertain to the art of cargo control systems, and more particularly, to a wireless portable aircraft cargo control panel with physical controls.

The proliferation of portable electronic devices (PEDs), such as tablet computing devices, mobile phones, etc., which are being integrated into a cockpits/cabins of aircrafts have revolutionized the aviation industry particularly in the area of cargo handling, crew interface, etc. The flexibility of PEDs enable implementation of control panel functionalities along with the displays in the PEDs. The portability of the PEDs enables the operator to freely carry the integrated control panel and display in the cargo compartment.

BRIEF DESCRIPTION

According to an embodiment, a system for a wireless portable cargo control panel with physical controls is provided. The system includes a portable electronic device (PED) comprising a display, the PED configured to communicate with a master control panel (MCP) that controls a cargo handling system, and a portable control panel (PCP), where the PCP includes an interface configured to couple the PED, one or more dedicated physical input selection devices, a directional controller, and one or more orientation indicator displays, wherein each of the one or more orientation indicator displays are configured to be updated based at least in part on orientation information associated with the cargo handling system, PCP, and PED.

In addition to one or more of the features described herein, or as an alternative, further embodiments include a directional controller that is a physical control joystick.

In addition to one or more of the features described herein, or as an alternative, further embodiments include one or more orientation indicator displays that correspond to a respective direction of the directional controller.

In addition to one or more of the features described herein, or as an alternative, further embodiments include one or more orientation indicator displays that are LCD or LED displays.

In addition to one or more of the features described herein, or as an alternative, further embodiments include one or more dedicated physical input selection devices that include a control panel switch, drive system switch, lateral drive switch, or pallet rotation switch, wherein the one or more dedicated physical input selection devices are configured to control the cargo handling system.

In addition to one or more of the features described herein, or as an alternative, further embodiments include a power source that is configured to charge a battery source of the PED.

In addition to one or more of the features described herein, or as an alternative, further embodiments include a display that is configured to display zone information, heading information of an aircraft including the cargo handling system, and equipment present in the respective zone, wherein the equipment is aligned with the aircraft heading.

In addition to one or more of the features described herein, or as an alternative, further embodiments include a PED having a wireless interface configured to communicate with the MCP to control the cargo handling system.

In addition to one or more of the features described herein, or as an alternative, further embodiments include a PED that is configured to detachably coupled to the PCP.

In addition to one or more of the features described herein, or as an alternative, further embodiments include a PED having a PED connector socket configured to be coupled to an interfacing connector of the PCP.

Embodiments also include a method of operating a wireless portable cargo control panel with physical controls. The method includes detecting a docking status of a portable electronic device (PED), modifying soft controls of a display of the PED, controlling cargo operations of a cargo compartment using inputs from at least one of the soft controls of the PED or physical controls of the PCP based on the docking status, and displaying a status of the cargo operation and a status of the control components on the display of the PED.

In addition to one or more of the features described herein, or as an alternative, further embodiments include responsive to docking the PED to the PCP, removing the soft controls from the display of the PED, and operating the display of the PED as a monitoring unit.

In addition to one or more of the features described herein, or as an alternative, further embodiments include responsive to undocking the PED from the PCP, restoring the soft controls on the display of the PED.

In addition to one or more of the features described herein, or as an alternative, further embodiments include when undocking the PED from the PCP, a configuration of the PCP configures a state of the PED.

In addition to one or more of the features described herein, or as an alternative, further embodiments include determining orientation information, displaying the orientation information on the display of the PED, and updating the status of the cargo operation and the status of the control components of the display of the PED based at least in part on the orientation information.

In addition to one or more of the features described herein, or as an alternative, further embodiments include updating orientation indicator displays of a directional controller of the PCP based at least in part on the orientation information.

In addition to one or more of the features described herein, or as an alternative, further embodiments include charging a power source of the PED.

In addition to one or more of the features described herein, or as an alternative, further embodiments include receiving the orientation information from at least one of the PED or a master control panel.

In addition to one or more of the features described herein, or as an alternative, further embodiments include orientation information that is based at least in part on a heading of an aircraft, and wherein the aircraft includes the cargo compartment.

In addition to one or more of the features described herein, or as an alternative, further embodiments include updating the display of the PED based on equipment present in a zone, wherein the equipment is aligned with the heading of the aircraft.

BRIEF DESCRIPTION OF THE DRAWINGS

The following descriptions should not be considered limiting in any way. With reference to the accompanying drawings, like elements are numbered alike:

FIG. 5 depicts a PCP in a RIGHT orientation in accordance with one or more embodiments;

FIG. 6 depicts a PCP in a FORWARD orientation in accordance with one or more embodiments;

FIG. 7 depicts a PCP in a LEFT orientation in accordance with one or more embodiments;

FIG. 8 depicts a PCP in an AFT orientation in accordance with one or more embodiments;

FIG. 9 depicts a PCP in a RIGHT orientation in accordance with one or more embodiments;

FIG. 10 depicts a PCP in a FORWARD orientation in accordance with one or more embodiments;

FIG. 11 depicts a PCP in a LEFT orientation in accordance with one or more embodiments;

FIG. 12 depicts a PCP in an AFT orientation in accordance with one or more embodiments;

DETAILED DESCRIPTION

Figure 1:
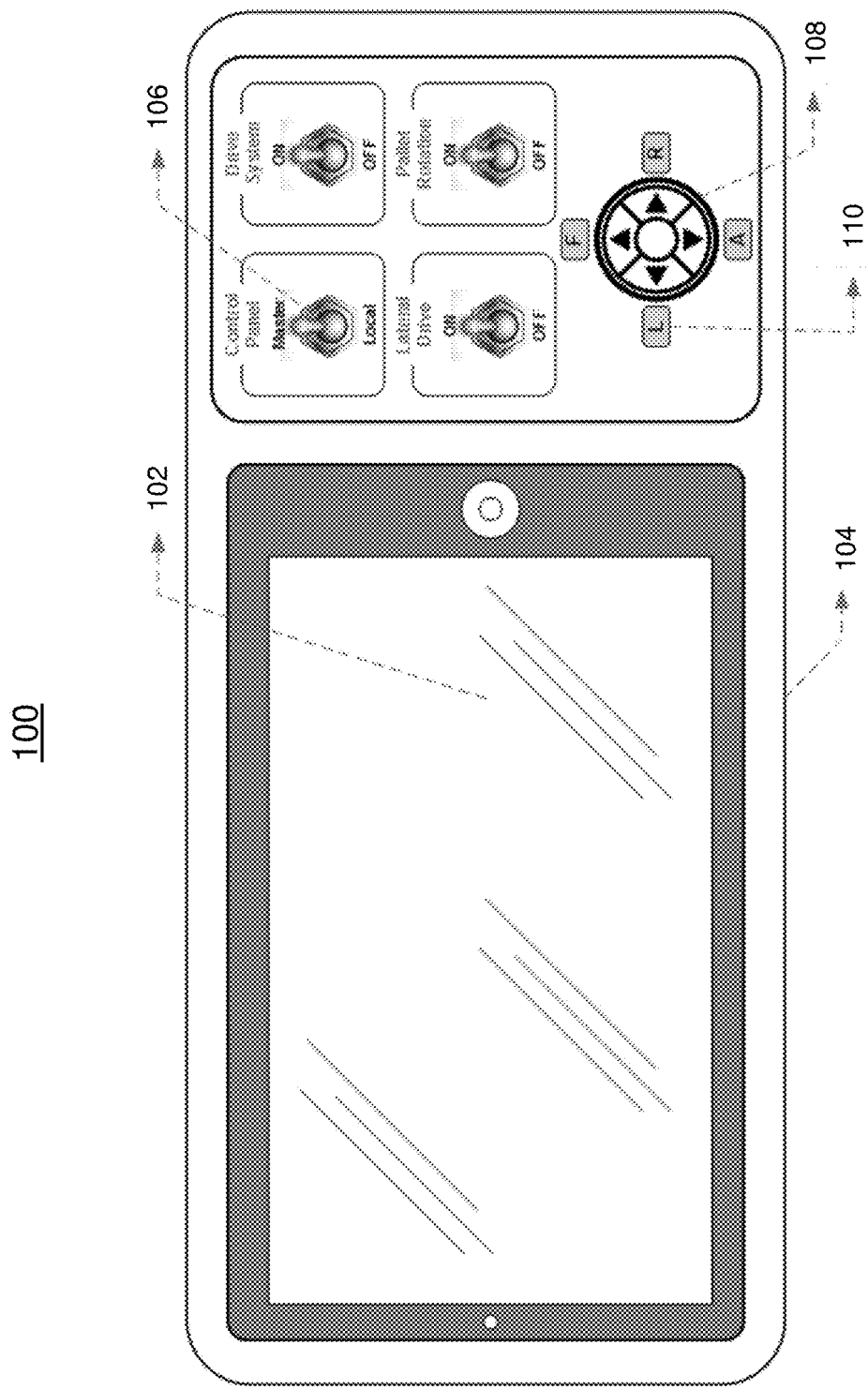
FIG. 1 depicts a portable electronic device and portable control panel (PCP) in accordance with one or more embodiments.

The items to be shipped via aircraft cargo are first loaded onto a unit load device (ULD), where each ULD is a specially configured pallet or specially configured container. The ULDs are available in various sizes, shapes, and capacities and can be selected/designed according to the configuration of the cargo storage area.

Once a ULD is loaded with cargo items, the ULD is loaded onto the aircraft through the doorway of the cargo storage area. Once inside the aircraft, the ULDs are moved in the cargo compartment by power drive units (PDUs) mounted at the floor level at fixed intervals down the length of the compartment. After storing the ULD in its final position it can be restrained by means of a mechanical or electro-mechanical restraint system. In addition, turntables can be installed in and forward of the doorway and can steer the ULDs to various positions as needed for IN/OUT, FWD/AFT, or pallet rotation modes. Multiple ULDs are brought onboard the aircraft and each is placed in its respective stowed position. The PDUs and turntables are also referred to as line replaceable units (LRUs).

The movement of ULDs are controlled using a master control panel (MCP) and/or outside control panel (OCP) and/or local control panels (LCPs). The cargo systems provide a dedicated display to enable the operator to monitor the status of ULD position and the status of the cargo LRUs. The MCP provides the control system operation status and cargo system status to the display. The display additionally enables the operator to perform various maintenance operations on the cargo systems. The MCP, OCP, LCP, and cargo maintenance display unit (CMDU) of the cargo handling system may be permanently fixed to the aircraft.

The control panel functionalities can be implemented in the portable electronic device (PED) to control the cargo handling system to operate the PDUs, turntables, etc. Oftentimes, the PED includes a touchscreen display including soft control inputs and can become damaged and inoperable. In some scenarios, the display screen is broken, user touch sensitivity is non-responsive, or an operator is using gloves on the PED which cannot detect an input which hinders the usability of the PED.

The techniques described herein provide for implementing the control panel functionalities on the portable control panel into a dock having physical control components to perform cargo operations. The dock provides physical controls in the event the soft controls of the PED become inoperable or disabled and the PED is operating in a monitoring mode.

The techniques provided herein provide a wireless portable cargo control panel for performing aircraft cargo loading/unloading and maintenance tests at the cargo components. The techniques also provide to dock/undock PED on the portable control panel, wherein the PCP includes physical control components like selection switches, control joystick and orientation indicator displays to perform the cargo operations in the aircraft. In addition, the automatic removal and restoration of soft control components in the PED based on the docked and undocked states of the PED in the PCP, respectively, are provided. The techniques described herein provide for dynamically updating the orientation display in the PCP based on the orientation of PED with respect to the aircraft heading. In addition, the techniques described herein provide for automatically configuring the physical control components based on the current operating zone of the PCP in the cargo compartment.

Turning now to a more detailed description, FIG. 1 depicts a system 100 including PED 102 and PCP 104 in accordance with one or more embodiments. The portable electronic device 102 is configured to function as a controller and a monitoring panel for cargo controls.

The PCP 104 including physical controls including toggle switches 106 and directional controls 108. As shown in FIG. 1, the toggle switches 106 include a control panel switch to configured the PCP 104 in the master control mode or a local control mode; a drive system switch configured to switch the drive system ON/OFF; a lateral drive switch configured to switch the lateral drive system ON/OFF; and a pallet rotation switch configured to switch the pallet rotation ON/OFF. It should be understood that other switches can be incorporated to control additional functions of the cargo area.

The PCP 104 also includes an orientation indicator displays 110. As shown, the orientation indicator displays 110 includes a small display, such as an LED or LCD display, that correspond to each direction of the directional controls 108. In one or more embodiments, each display of the orientation indicator display 110 is updated based on the orientation of the PCP 104 with respect to the cargo area of the aircraft (aircraft heading) as described below. The example of the orientation indicator displays 110 indicate the directions forward (F), right (R), aft (A), and left (L). It should be understood that other indicators can be used for the orientation indicator displays 110.

Figure 2:
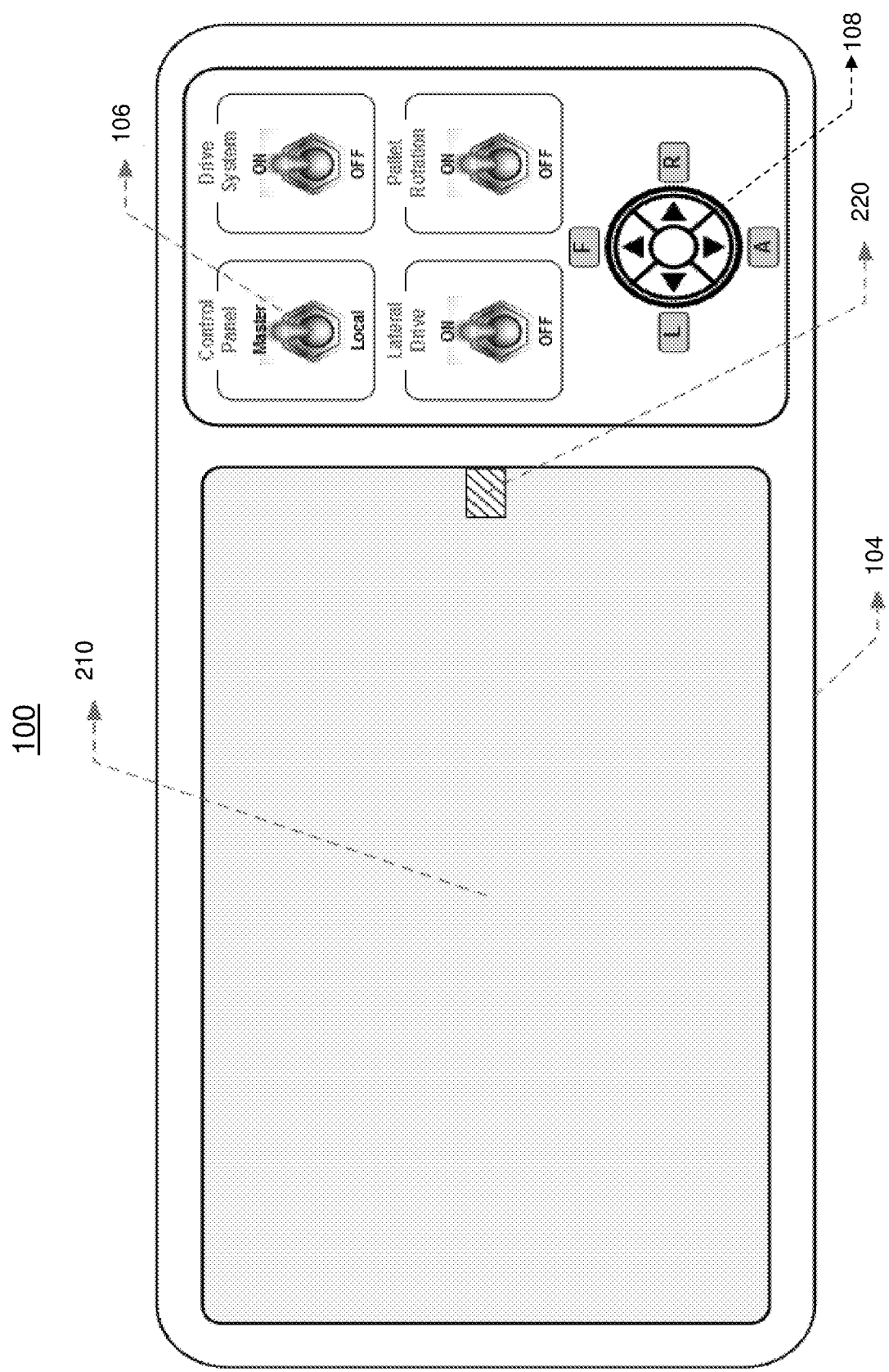
FIG. 2 depicts a PCP in accordance with one or more embodiments.

In FIG. 2, the PCP 104 is shown in accordance with one or more embodiments. The PCP 104 is shown without having the PED 102 docked in the housing of the PCP 104 exposing the docking area 210 and interfacing connector 220 for the PED 102 (not shown). The interface connector 220 provides a means for coupling the PCP 104 to the PED 102 and exchanging data between a docked PED 102 and the PCP 104 such as control data, orientation data, etc. In addition, the interfacing connector 220 can detect the docking of the PED 102 and used to modify the display of the PED 102 such as removing or restoring the soft controls based on a docked state of the PED 102. In other embodiments, the PED 102 and PCP 104 can communicate over a wireless connection without being required to be physically coupled using the interfacing connector 220.

Figure 3:
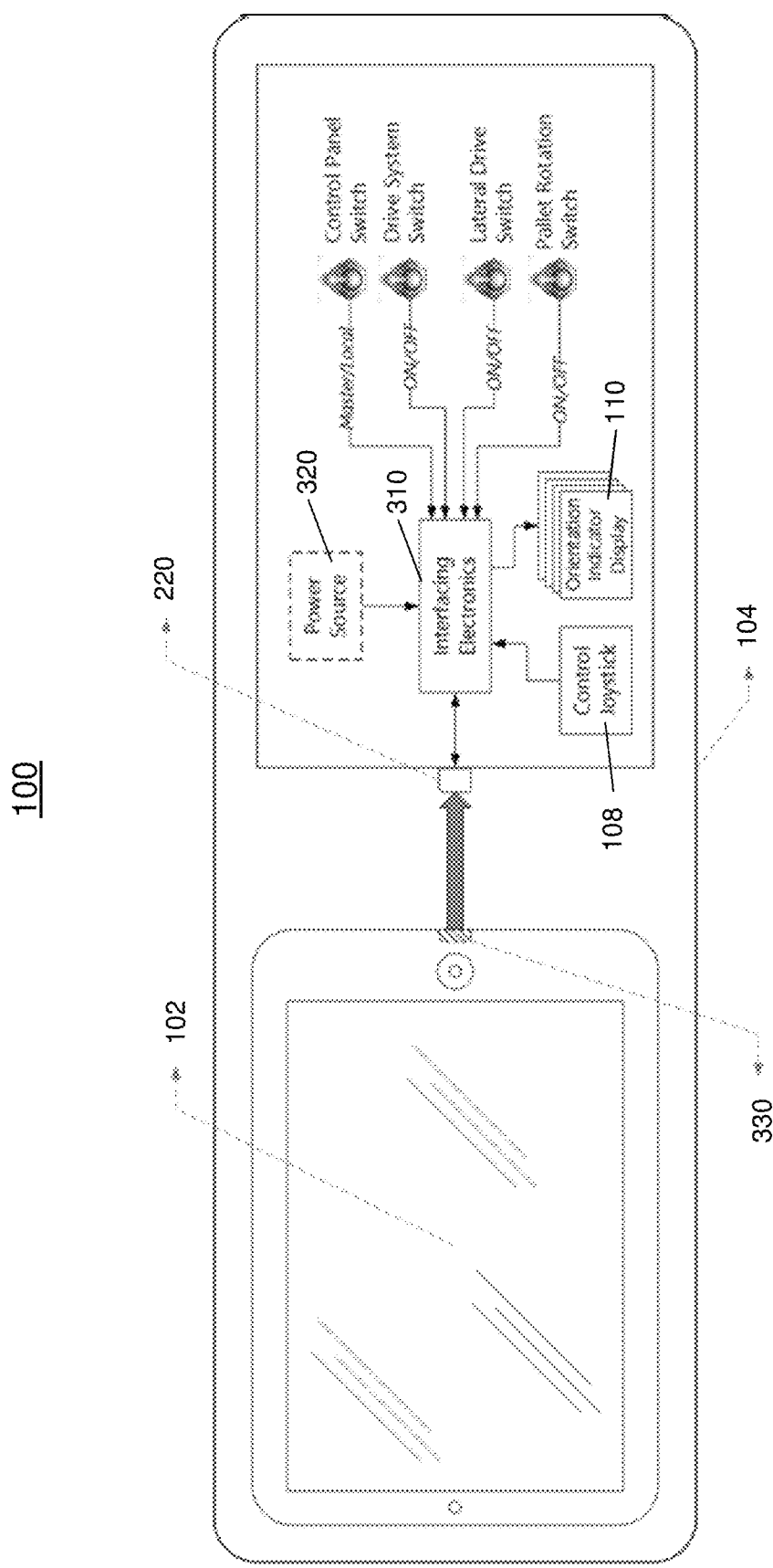
FIG. 3 depicts an architecture of the components of the PCP in accordance with one or more embodiments.

In FIG. 3, an architecture of the components of the PCP 104 in accordance with one or more embodiments is shown. The PCP 104 includes a processor, such as the interfacing electronics 310 which is configured to receive and process various information. As shown, the processor is coupled to the power source 320 and is configured to provide power to and charge a docked PED 102. The PED connector socket 330 is configured to be coupled to the interfacing connector 220 of the PCP 104. In addition, the interfacing electronics 310 is coupled to the control joystick 108 and the orientation indicator displays 110. It is to be understood the PCP 104 can include the appropriate interfaces to communicate wirelessly with the PED 102 or other systems for controlling and monitoring the cargo handling system. The interfacing electronics 310 is configured to receive inputs from the physical input selection device such as toggle switches 106 to control the operation of the cargo handling system.

Figure 4:
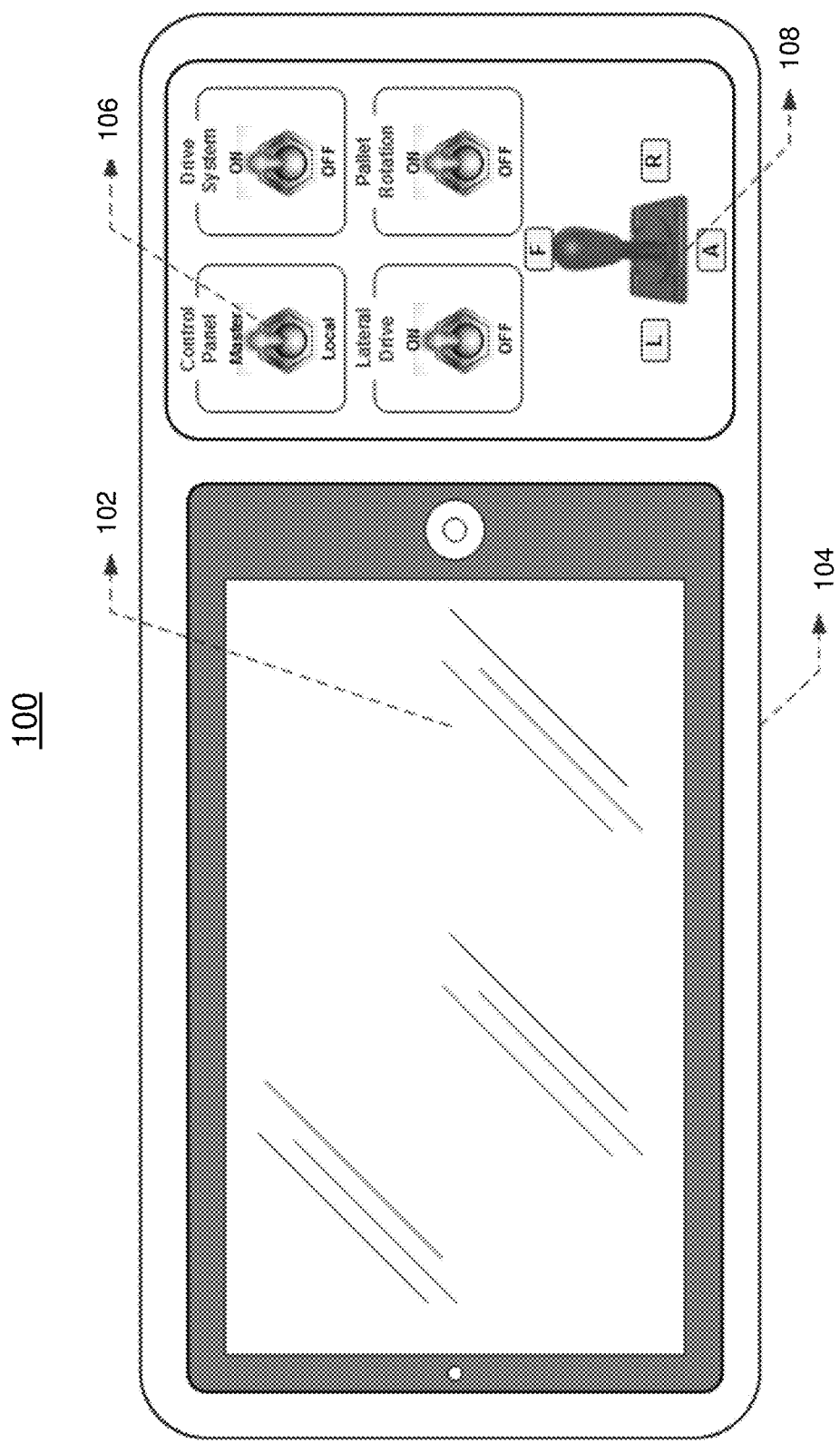
FIG. 4 depicts an example PCP having control joystick in accordance with one or more embodiments.

Now referring to FIG. 4, an example PCP 104 having control joystick 108 in accordance with one or more embodiments is shown. As shown, each direction of the control joystick 108 includes an orientation indicator display 110 to provide intuitive controls to the operator. It should be understood that other types of physical controllers and switches can be included on the PCP 104.

Figure 5:
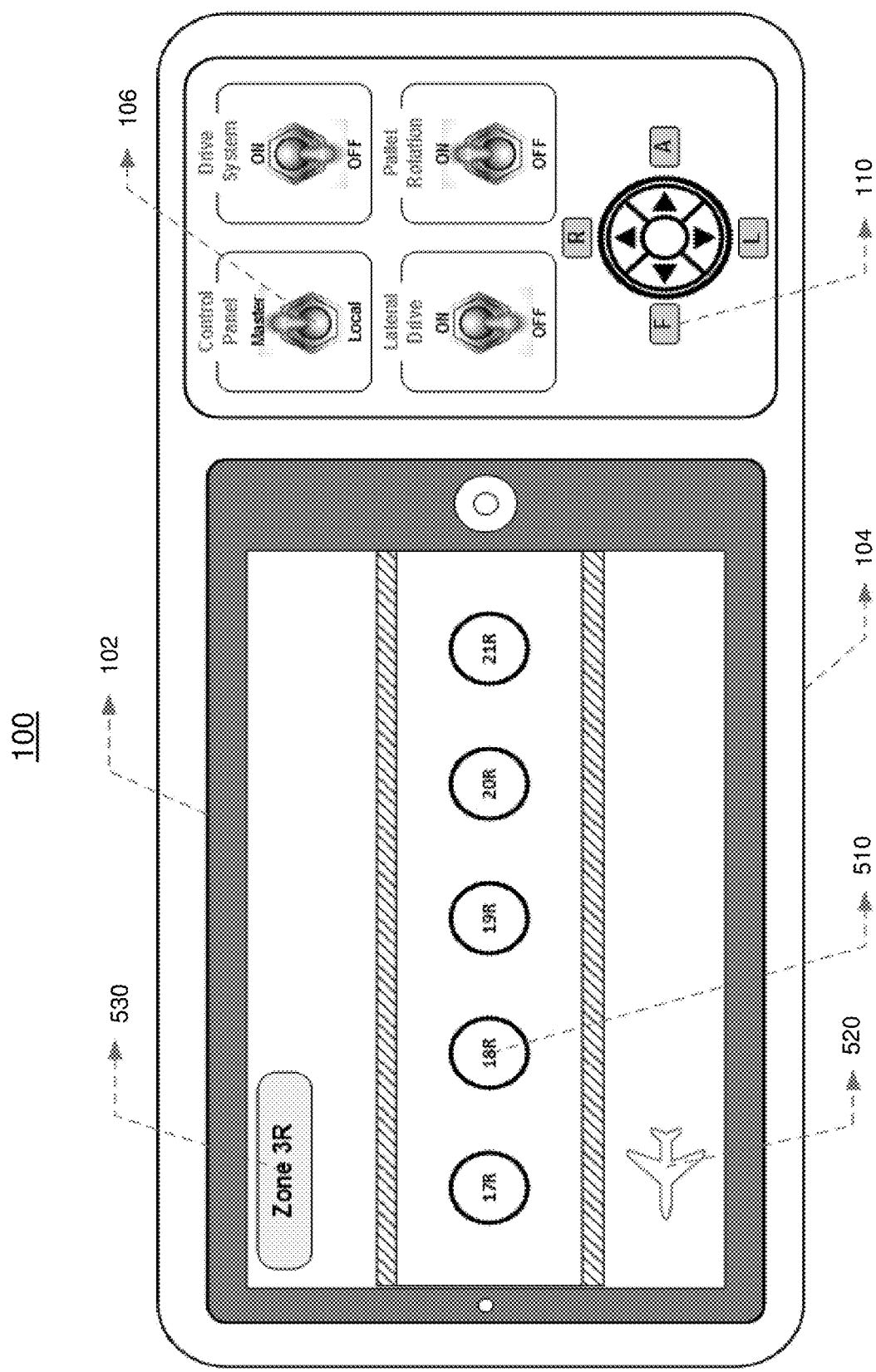
FIGS. 5-8 depict various orientations of the PCP in accordance with one or more embodiments.

FIGS. 5-8 depict a PCP in various orientations in accordance with one or more embodiments. In FIG. 5, a PCP 104 in a RIGHT orientation of a zone having turntables 510 is shown. The PED 102 is configured to detect the orientation of the display with respect to the aircraft heading 520 which indicates an orientation of the cargo compartment of the aircraft. In addition, the PED 102 and/or PCP 104 are configured to register with a zone of the cargo compartment which is indicated in the zone indicator 530, where each zone can include various types of equipment such as turntables, PDUs, etc. As shown, the turntables 510 are illustrated from left-to-right 17R, 18R, 19R, 20R, 21R where the sequence and presentation of the turntables 510 are dependent upon the aircraft heading.

In one or more embodiments, the PCP 104 receives the operator current viewing direction (PED orientation) and the aircraft heading information from the PED 102, and automatically updates the orientation indicator displays in the portable control panel. The display of cargo components in the PED 102 are updated to align with the aircraft heading.

In zone 3, the physical control joystick 108 provides the ability to move the cargo ULD in all four directions, (i.e. FORWARD, AFT, LEFT, and RIGHT). The physical selection switches 106 provide the ability to rotate and drive the cargo ULD in zone 3.

Figure 6:
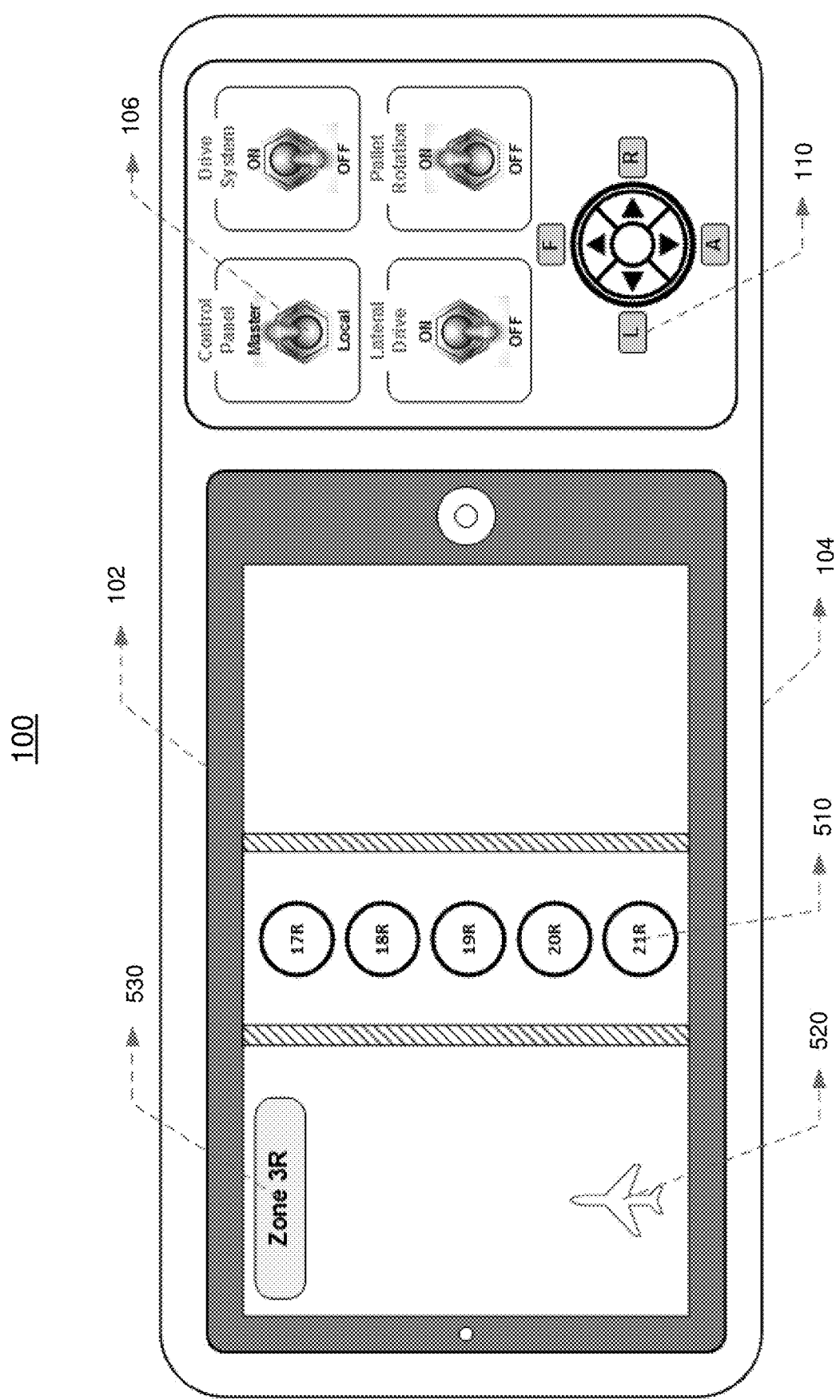

In FIG. 6, the PCP 104 is shown in a FORWARD orientation in accordance with one or more embodiments. As shown in FIG. 6, the display of the PED 102 depicts the same zone (Zone 3R) as shown in FIG. 5. The turntables 510 are illustrated from top-to-bottom 17R, 18R, 19R, 20R, 21R where the sequence and presentation are aligned with the aircraft heading.

Figure 7:
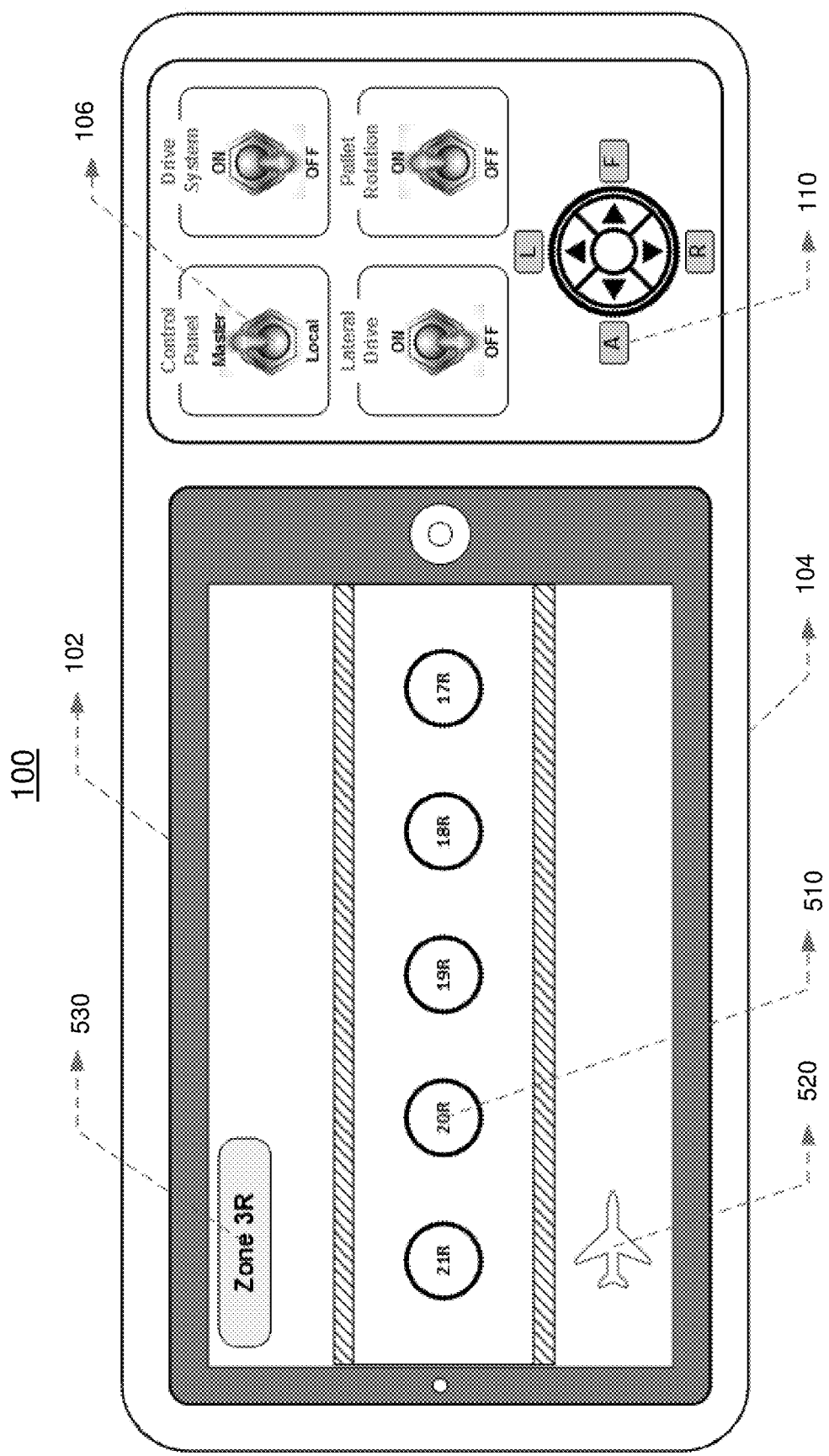

In FIG. 7, the PCP 104 is shown in a LEFT orientation in accordance with one or more embodiments. As shown in FIG. 7, the display of the PED 102 depicts the same zone (Zone 3R) as shown in FIG. 5. As shown, the turntables 510 are illustrated from left-to-right 21R, 20R, 19R, 18R, 17R which is in the reverse direction of that shown in FIG. 5.

Figure 8:
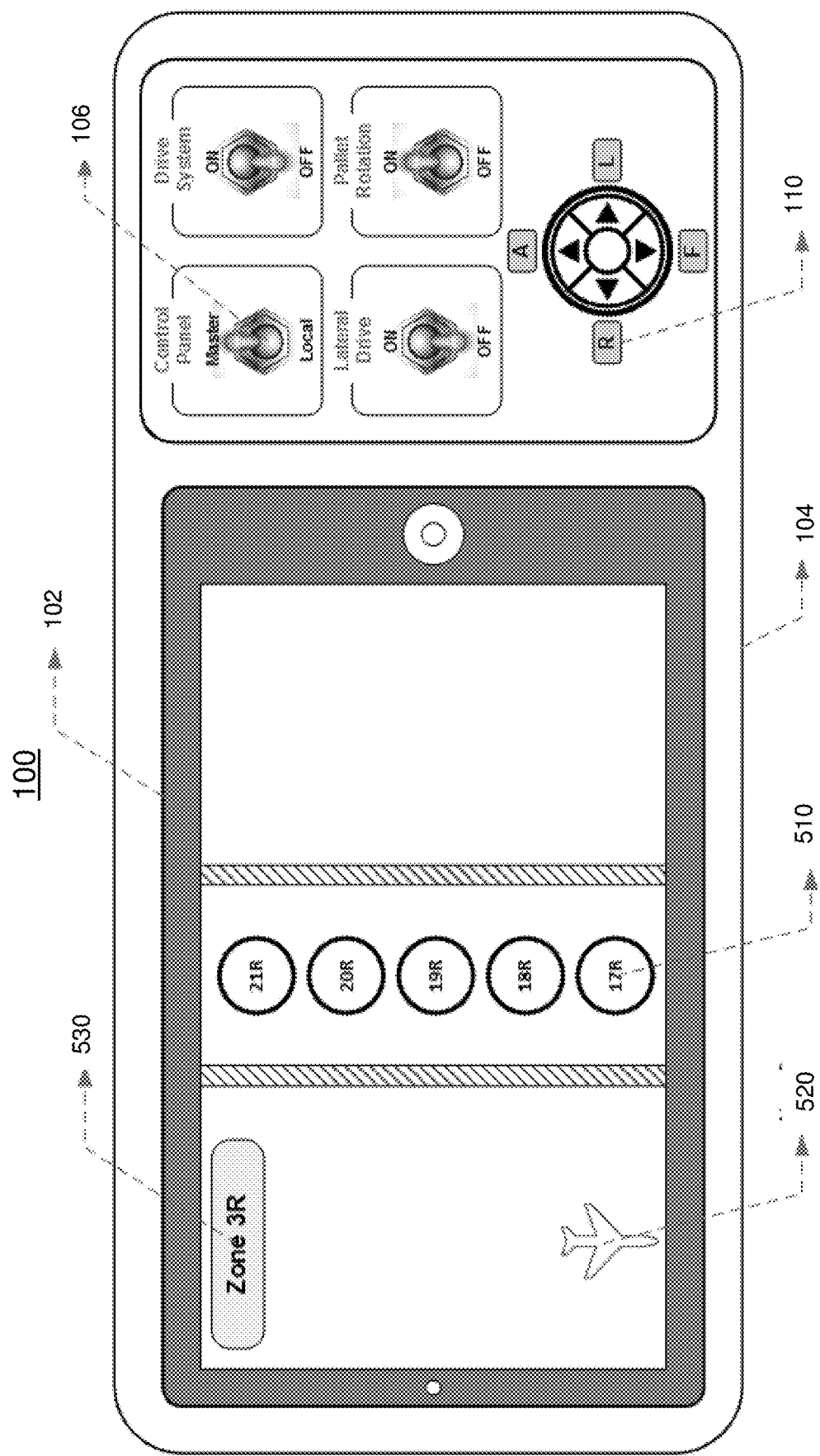

In FIG. 8, the PCP 104 is shown in an AFT orientation in accordance with one or more embodiments. As shown in FIG. 8, the display of the PED 102 depicts the same zone as shown in FIG. 5. As shown, the turntables 510 are illustrated from top-to-bottom 21R, 20R, 19R, 18R, 17R which is in the reverse direction of that shown in FIG. 6.

Figure 9:
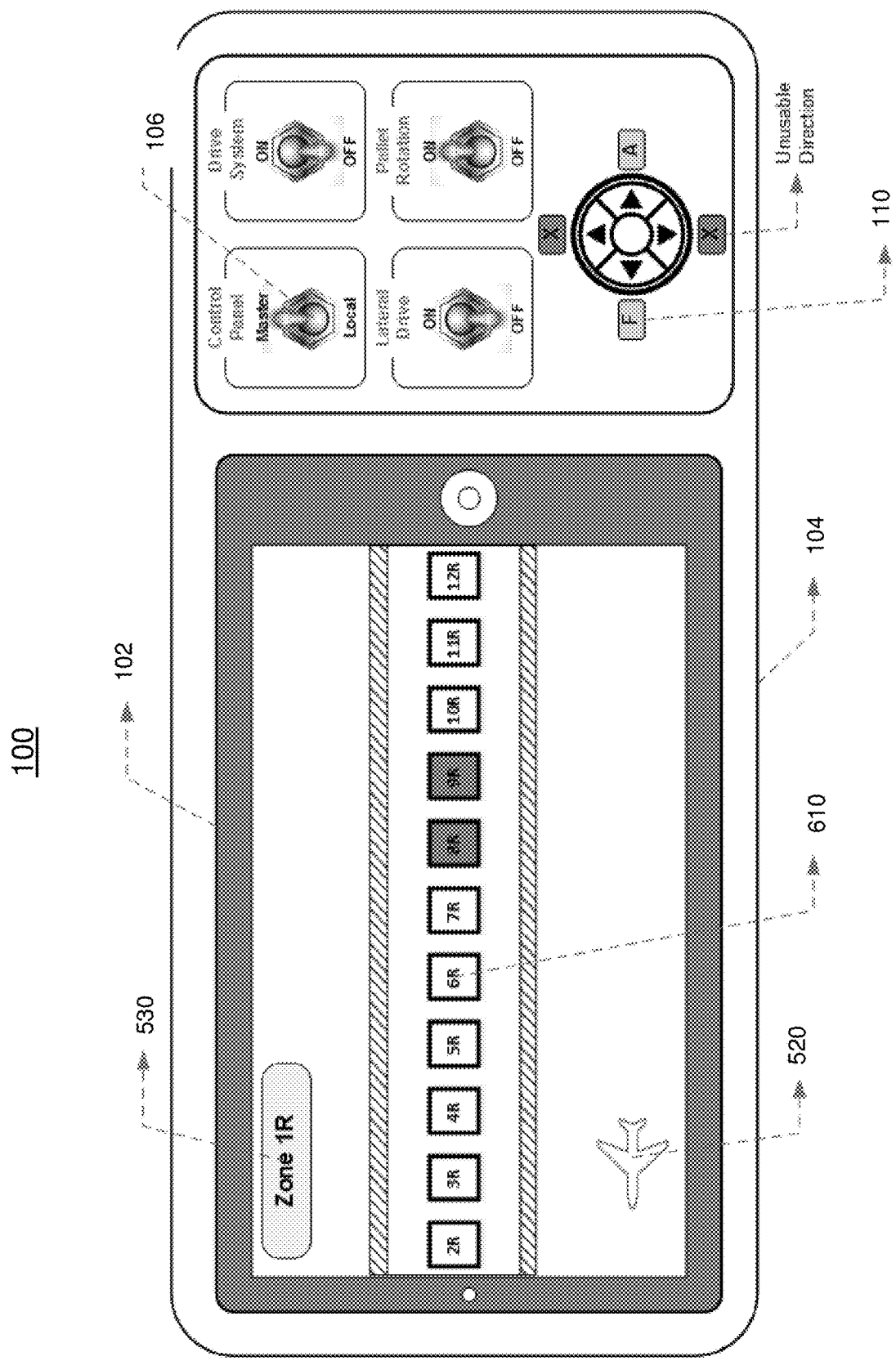
FIGS. 9-12 depict various orientations of the PCP in accordance with one or more embodiments.

FIGS. 9-12 depict a PCP in various orientations in accordance with one or more embodiments. In FIG. 9, the PCP 104 is shown in a RIGHT orientation in accordance with one or more embodiments. As shown in FIG. 9, the orientation indicator displays 110 correspond to the functionality of the equipment provided in each zone. In this non-limiting example, the Zone 1R is configured with a plurality of PDUs 610 (2R-12R) that can be controlled by different controllers including the PED 102 and the PCP 104. As shown in FIG. 9, the LEFT and RIGHT controls of the PDU 610 are disabled and cannot be controlled by the PCP 104 because the PDUs 610 can only be controlled to operate in a forward and aft direction. In this example, the orientation indicator display 110 in the PCP 104 shows an "X" mark to visually alert the operator that the drive commands in these directions are and are unusable and not processed.

Figure 10:
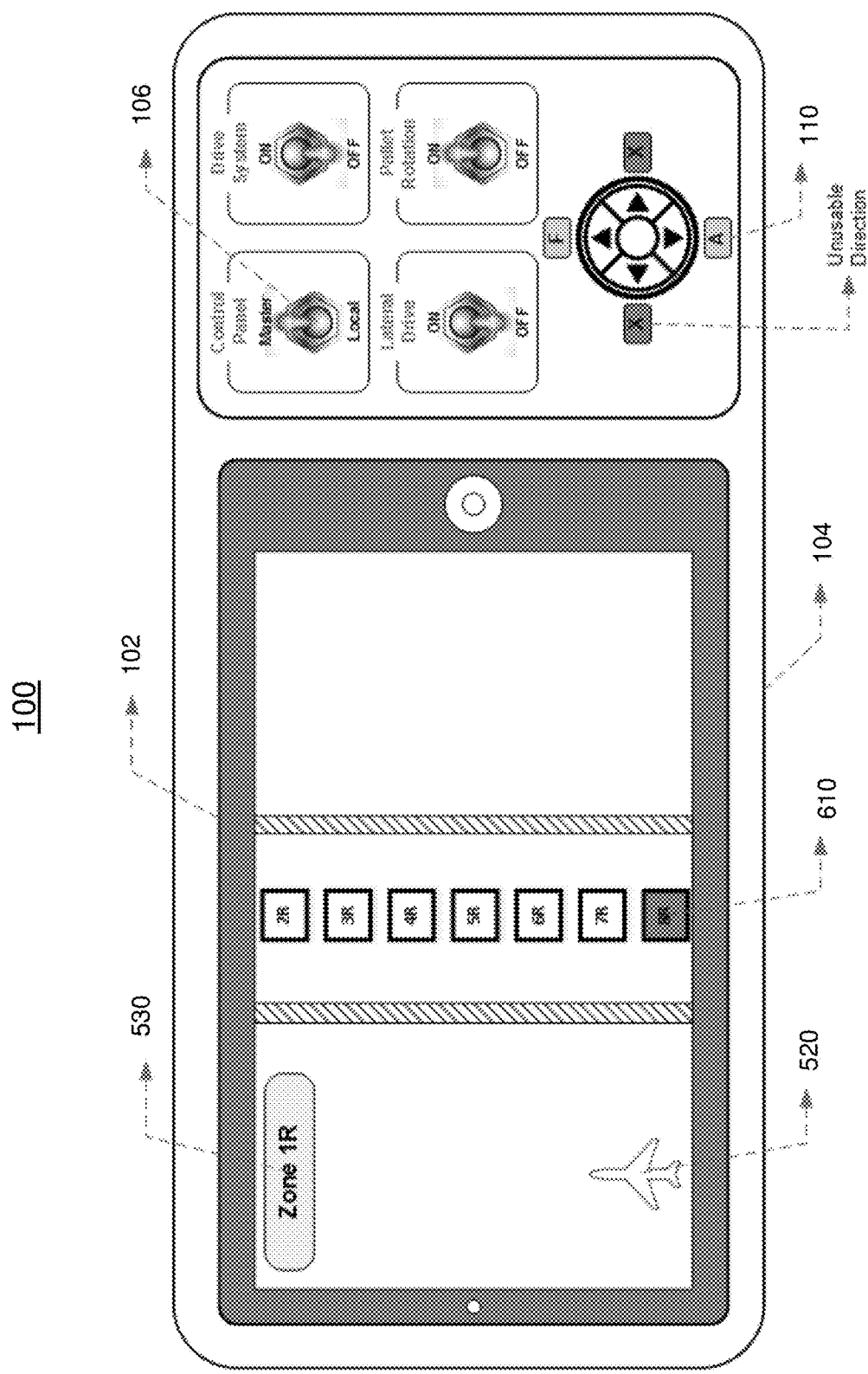

In FIG. 10, a PCP 104 is shown in a FORWARD orientation in accordance with one or more embodiments. The PDUs 610 are arranged in a direction and sequence based on the aircraft heading. In this example, the PDUs 610 are arranged from top-to-bottom in the sequence form 2R-8R.

Figure 11:
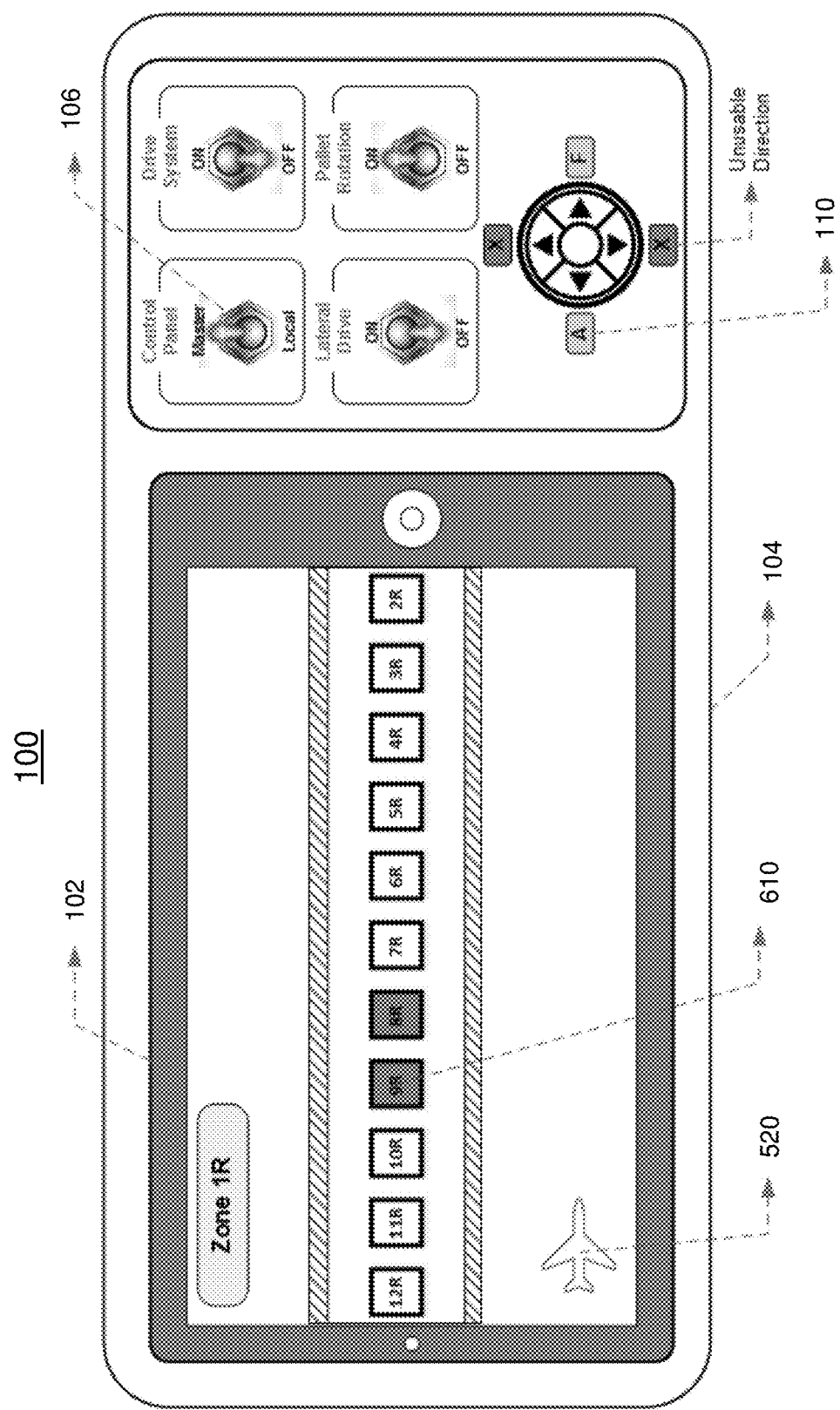

In FIG. 11, a PCP 104 is shown in a LEFT orientation in accordance with one or more embodiments. The PDUs 610 are arranged in a direction and sequence based on the aircraft heading. In this example, the PDUs 610 are arranged from left-to-right in the sequence form 12R-2R, which is in the reverse direction to that shown in FIG. 9.

Figure 12:
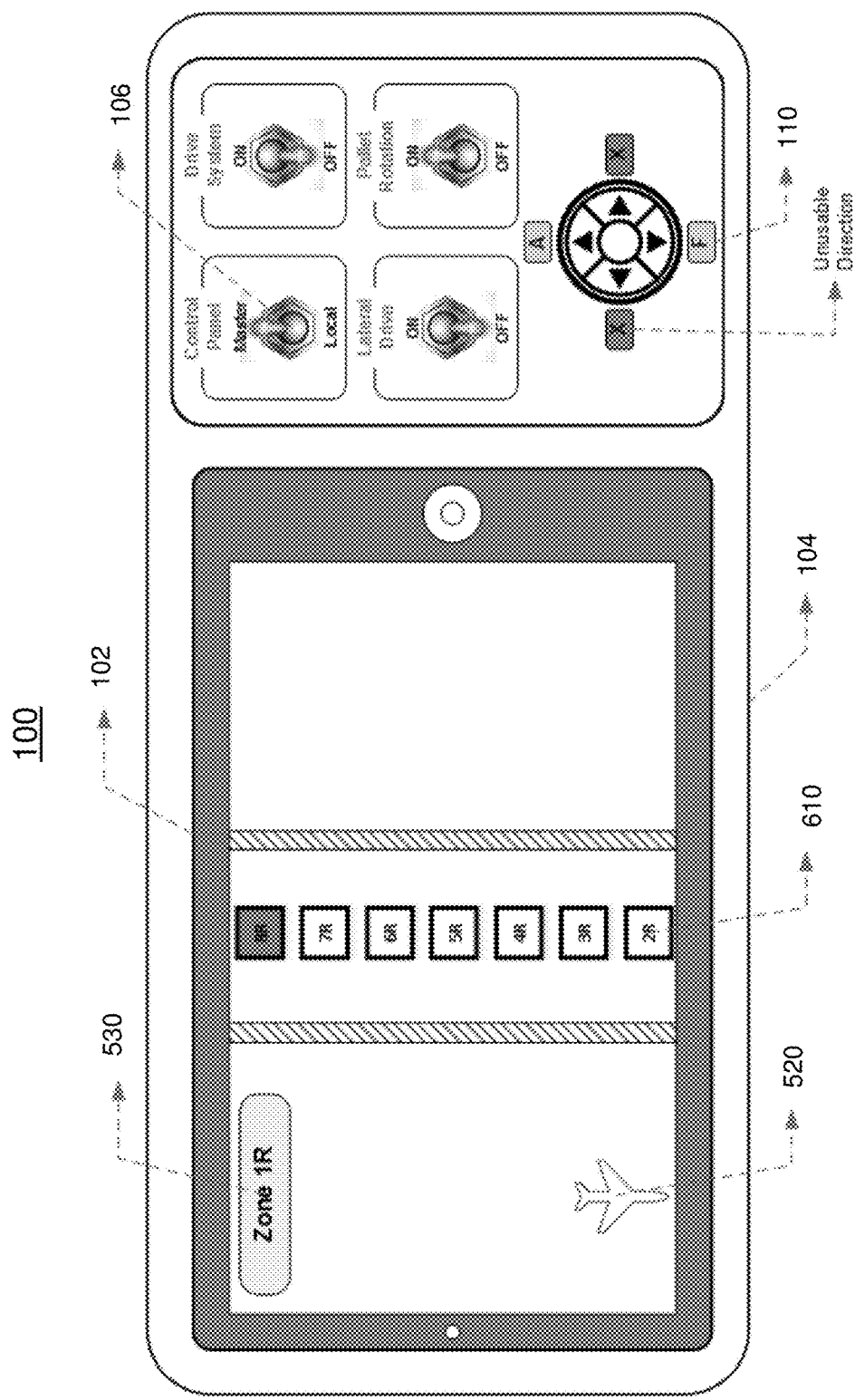

In FIG. 12, a PCP 104 is shown in an AFT orientation in accordance with one or more embodiments. The PDUs 610 are arranged in a direction and sequence based on the aircraft heading. In this example, the PDUs 610 are arranged from top-to-bottom in the sequence form 8R-2R, which is in the reverse direction to that shown in FIG. 10.

Figure 13:
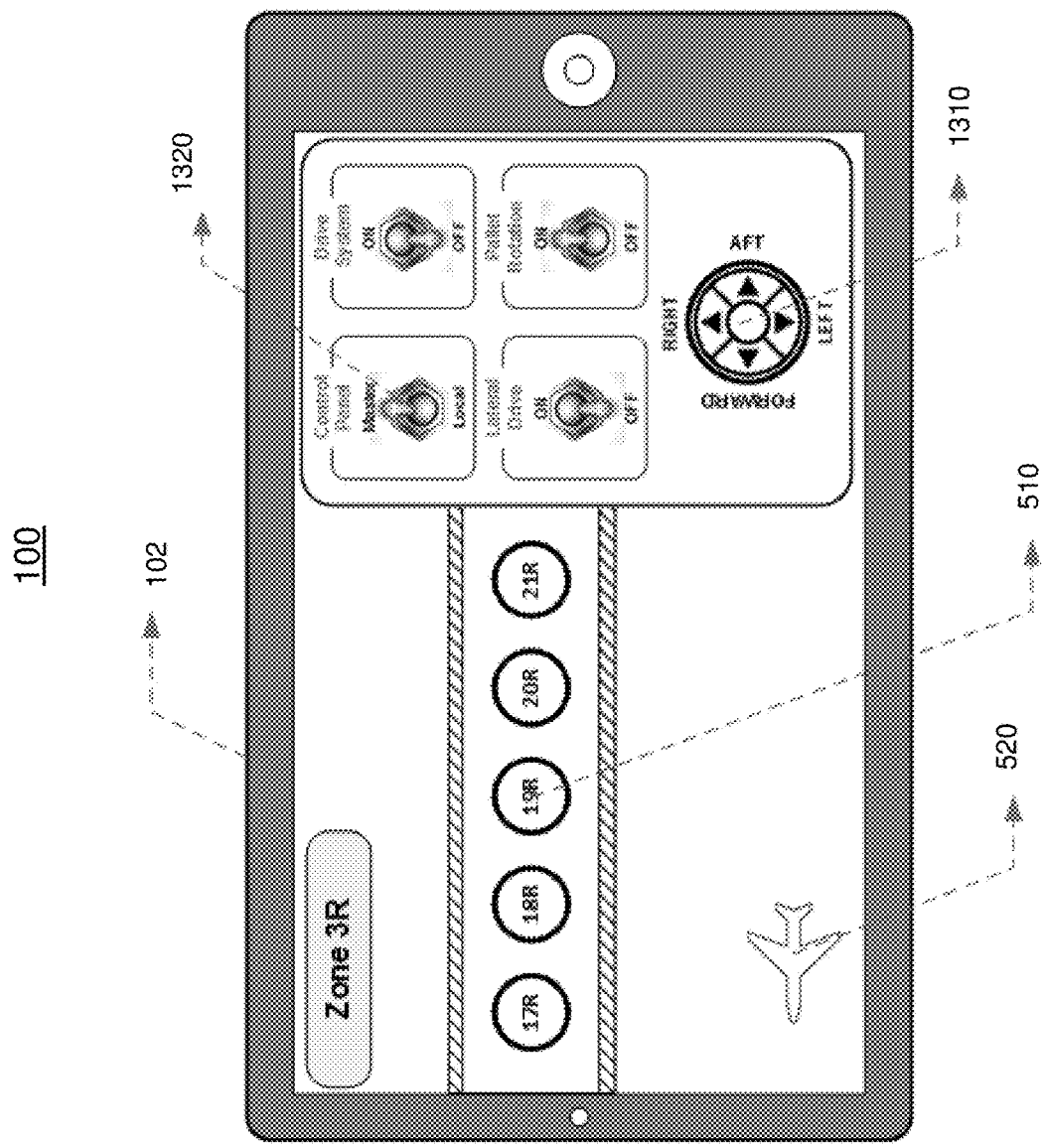
FIG. 13 depicts an undocked PED in accordance with one or more embodiments.

Now referring to FIG. 13, an undocked PED 102 in accordance with one or more embodiments is shown. FIG. 13 illustrates a similar zone an orientation of that shown in FIG. 5. Responsive to undocking the PED 102 from the PCP 104, the soft control components (selection switches and joystick) are automatically restored in the PED 102 according to the respective zones to be controlled. In one or more embodiments, the PED 102 adopts the last state configured by the PCP 104.

The PED 102 as shown displays a zone indicator 530 and aircraft heading 520. In addition, the display also includes the soft directional controls 1310 having corresponding orientation indicators. The display of the PED 102 also includes the soft controls 1320 for controlling the equipment in each cargo compartment.

The display corresponds to the zone the PED 102 is registered to. The options for controls are automatically updated based on the equipment present in the zone of the cargo handling system. For example, some zones are equipped with power drive units and turntables while other zones are only equipped with either power drive units or turntables. In the example shown in FIG. 13 the display of the PED 102 includes turntables located in zone 3R that can be controlled by the PED 102. The soft directional controls 1310 can be configured to rotate the directional control based on the heading of an aircraft housing the cargo compartment to provide an intuitive control for the operator. In this example, the forward direction for controlling the equipment is aligned with the forward direction of the aircraft heading.

Figure 14:
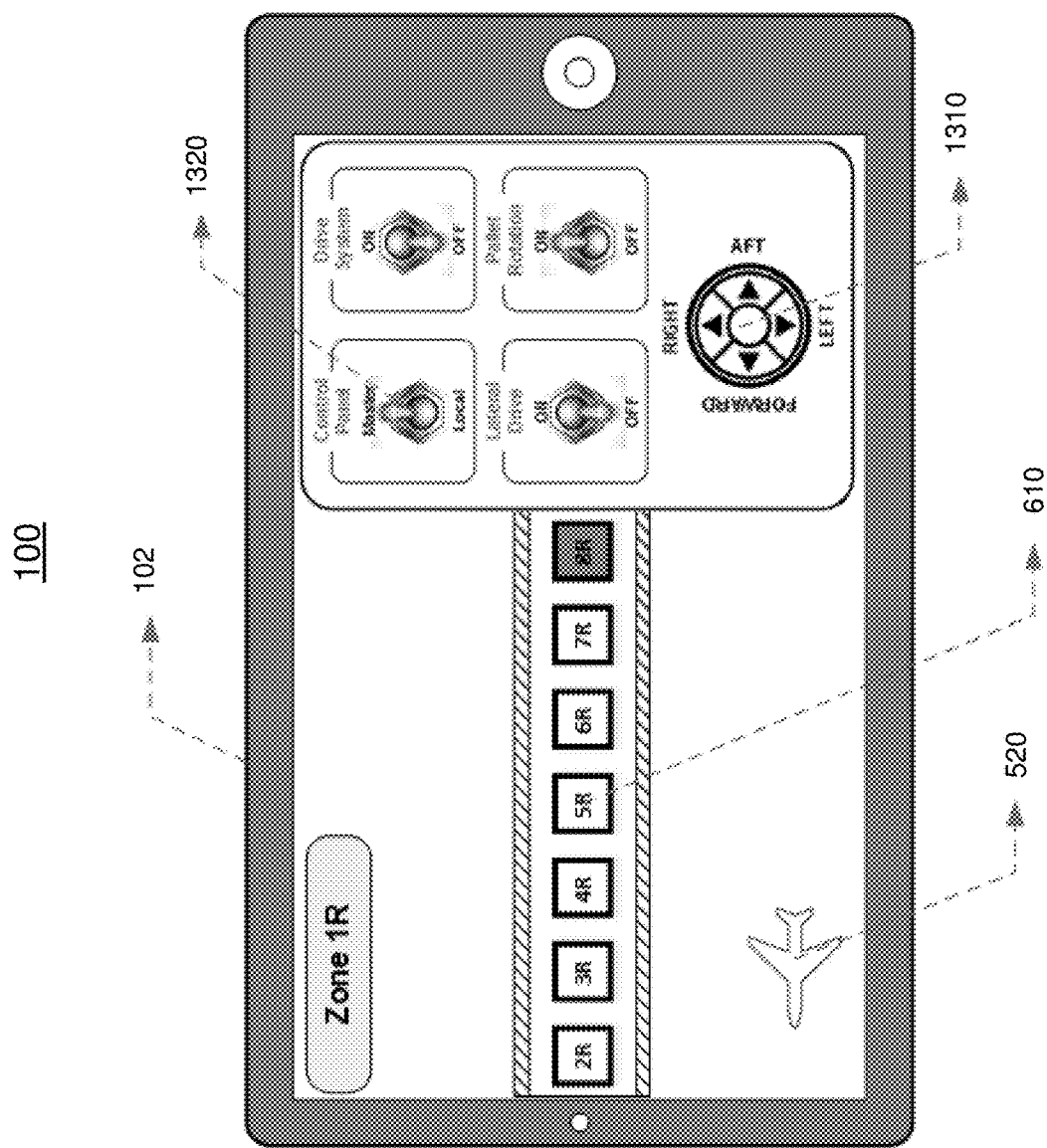
FIG. 14 depicts an undocked PED in accordance with one or more embodiments.

FIG. 14 depicts an undocked PED 102 in accordance with one or more embodiments. In the non-limiting example shown in FIG. 14, the display of the PED 102 includes power drive units 610 of the zone 1R that can be controlled by the PED 102. The soft controls 1310 and the display are presented and aligned based on the aircraft heading as described above.

Figure 15:
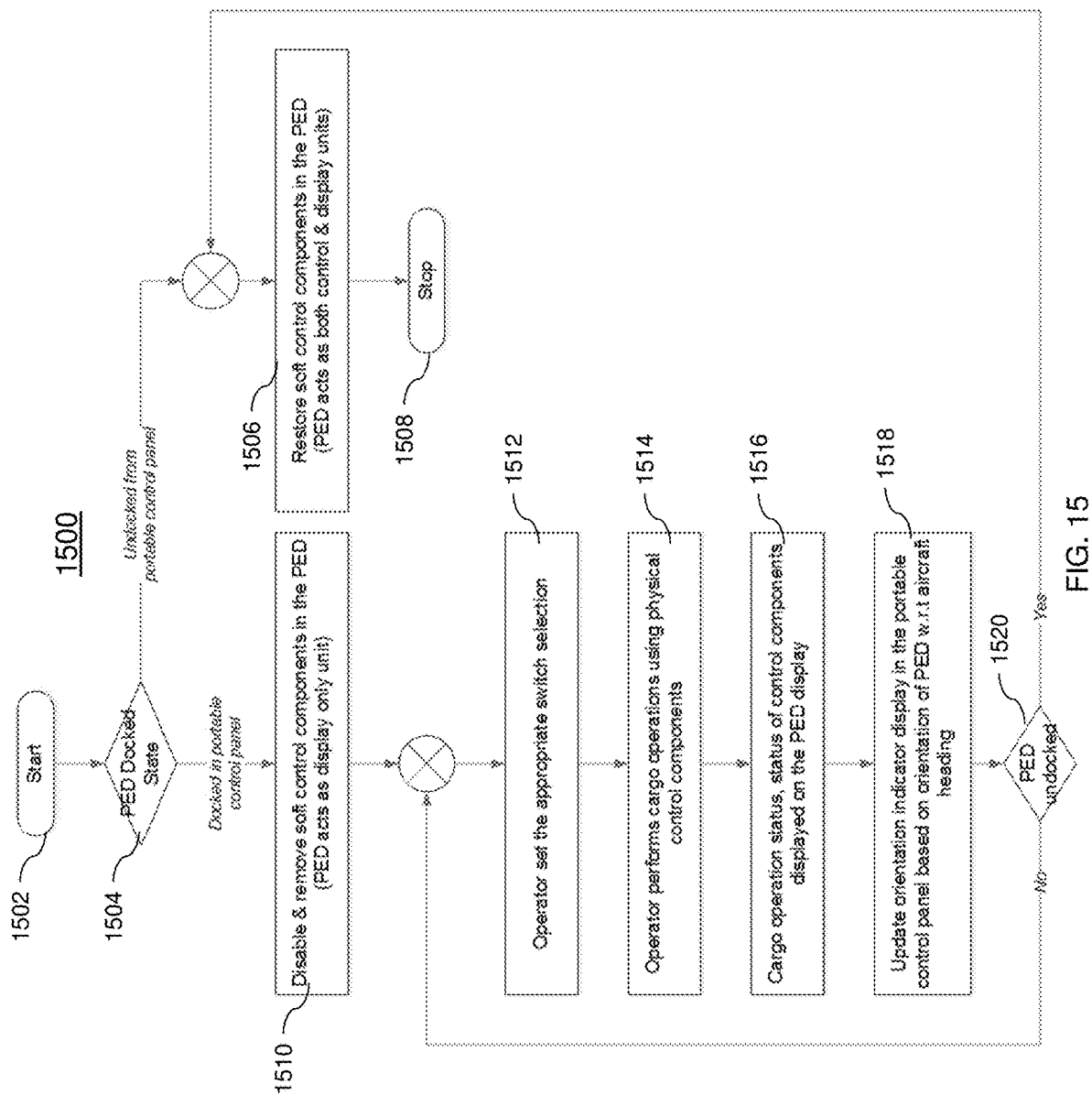
FIG. 15 depicts a flowchart of a method for operating a wireless portable cargo control panel with physical controls in accordance with one or more embodiments.

Now referring to FIG. 15, a flowchart of a method 1500 for operating a wireless portable aircraft cargo control panel with physical controls in accordance with one or more embodiments is shown. The method 1500 begins at block 1502 and proceeds to decision block 1504 which provides for determining whether the PED is in a docked state. In the event the PED 102 is docked to the PCP, block 1506 provides for restoring soft control components in the PED 102, where the PED 102 is configured as both a controller and display unit. The method 1500 ends at block 1508. At decision block 1504, if it is determined that the PED 102 is docked to the PCP the method 1500 continues to block 1510 which provides for disabling and removing the soft control components in the PED 102, where the PED 102 is configured as a display unit. At block 1512 the method 1500 includes an operator setting the appropriate switch selection, and continues to block 1514 which includes an operator performing cargo operations using physical control components. The method 1500 continues to block 1516 which includes displaying the cargo operation status and the status of control components on the PED 102 display. At block 1518, the method 1500 provides for updating the orientation indicator display in the PCP based on the orientation of the PED 102 with respect to the aircraft heading. The method 1500 continues to decision block 1520 which determines the docked state of the PED 102. If so ("Yes" branch), the method 1500 continues to block 1506. If not ("No" branch), the method 1500 proceeds to block 1512.

The technical effects and benefits include providing a portable electronic device can be operated in spite of physical damage to the glass, low or non-sensitive user touch inputs, operator using the PED 102 with gloves on, etc. The technical effects and benefits provide an intuitive interface similar to that of existing cargo handling systems for operators. In addition, the PED 102 when docked in the PCP 104 can be used as both a control panel and as a cargo monitoring device. The technical effects and benefits include providing an alternate means for controlling the cargo systems when the portable device becomes damaged.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for a wireless portable cargo control panel with physical controls, the system comprising:
 a portable electronic device (PED) comprising a display, the PED configured to communicate with a master control panel (MCP) that controls a cargo handling system;
 a portable control panel (PCP) comprising:
  an interface configured to couple the PED;
  one or more dedicated physical input selection devices;
  a directional controller;
  one or more orientation indicator displays, wherein each of the one or more orientation indicator displays are configured to be updated based at least in part on orientation information associated with the cargo handling system, PCP, and/or PED,
 wherein the display is configured to display zone information, heading information of an aircraft including the cargo handling system, and equipment present in the respective zone, wherein the equipment is aligned with the aircraft heading.

2. The system of claim 1, wherein the directional controller is a physical control joystick.

3. The system of claim 2, wherein the one or more orientation indicator displays corresponds to a respective direction of the directional controller.

4. The system of claim 3, wherein the one or more orientation indicator displays are LCD or LED displays.

5. The system of claim 1, wherein the one or more dedicated physical input selection devices comprise a control panel switch, drive system switch, lateral drive switch, or pallet rotation switch, wherein the one or more dedicated physical input selection devices are configured to control the cargo handling system.

6. The system of claim 1, further comprising a power source configured to charge a battery source of the PED.

7. The system of claim 1, wherein the PED comprises a wireless interface configured to communicate with the MCP to monitor and control the cargo handling system.

8. The system of claim 1, wherein the PED is configured to be detachably coupled to the PCP.

9. The system of claim 1, wherein the PED further comprises a PED connector socket configured to be coupled to an interfacing connector of the PCP.

10. A method of operating a wireless portable cargo control panel with physical controls, the method comprising:

detecting a docking status of a portable electronic device (PED);

modifying soft controls of a display of the PED;

controlling cargo operations of a cargo compartment using inputs from at least one of the soft controls of the PED or physical controls of the PCP based on the docking status; and displaying a status of the cargo operation and a status of the control components on the display of the PED; and receiving the orientation information from at least one of the PED or a master control panel, wherein the orientation information is based at least in part on a heading of an aircraft, wherein the aircraft comprises the cargo compartment.

11. The method of claim 10 further comprising responsive to docking the PED to the PCP, removing the soft controls from the display of the PED; and operating the display of the PED as a monitoring unit.

12. The method of claim 10, further comprising responsive to undocking the PED from the PCP, restoring the soft controls on the display of the PED.

13. The method of claim 12, wherein undocking the PED from the PCP, a configuration of the PCP configures a state of the PED.

14. The method of claim 10, further comprising determining orientation information;

displaying the orientation information on the display of the PED; and updating the status of the cargo operation and the status of the control components of the display of the PED based at least in part on the orientation information.

15. The method of claim 10, further comprising updating orientation indicator displays of a directional controller of the PCP based at least in part on the orientation information.

16. The method of claim 10, further comprising charging a power source of the PED.

17. The method of claim 10, further comprising updating the display of the PED based on equipment present in a zone, wherein the equipment is aligned with the heading of the aircraft.

\* \* \* \* \*